(12) United States Patent
Sakano et al.

(10) Patent No.: US 12,222,129 B2
(45) Date of Patent: Feb. 11, 2025

(54) AIR CONDITIONER

(71) Applicant: BROTHER KOGYO KABUSHIKI KAISHA, Nagoya (JP)

(72) Inventors: Yuji Sakano, Toyota (JP); Ryuta Iijima, Nagoya (JP); Shigeki Yoshida, Toyoake (JP); Naokatsu Osawa, Nagoya (JP); Masashi Ichihashi, Mizuho (JP); Manabu Shirai, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 241 days.

(21) Appl. No.: 17/866,038

(22) Filed: Jul. 15, 2022

(65) Prior Publication Data
US 2022/0349614 A1 Nov. 3, 2022

Related U.S. Application Data

(63) Continuation of application No. PCT/JP2021/001224, filed on Jan. 15, 2021.

(30) Foreign Application Priority Data

Jan. 20, 2020 (JP) ................................. 2020-006967

(51) Int. Cl.
*F24F 13/06* (2006.01)
*F24F 5/00* (2006.01)
*F24F 12/00* (2006.01)

(52) U.S. Cl.
CPC ............ *F24F 13/06* (2013.01); *F24F 5/0035* (2013.01); *F24F 12/00* (2013.01); *F24F 12/001* (2013.01)

(58) Field of Classification Search
CPC .......... F24F 5/0035; F24F 13/00; F24F 13/06; F24F 13/22; F24F 2006/008; F24F 1/0007; F24F 1/039; F24F 12/00; F24F 12/01
See application file for complete search history.

(56) References Cited

U.S. PATENT DOCUMENTS

| 4,429,735 A | 2/1984 | Nomaguchi et al. |
| 4,771,611 A | 9/1988 | McNab |
| (Continued) | | |

FOREIGN PATENT DOCUMENTS

| CN | 203364321 U | 12/2013 |
| EP | 0448935 A2 | 10/1991 |
| (Continued) | | |

OTHER PUBLICATIONS

Jul. 6, 2023 Office Action issued in Chinese Patent Application No. 202110070933.8.
(Continued)

*Primary Examiner* — Joseph F Trpisovsky
(74) *Attorney, Agent, or Firm* — Oliff PLC

(57) ABSTRACT

An air conditioner includes a housing having a first outlet and a second outlet, a first channel communicating with the first outlet, a second channel communicating with the second outlet, a tank unit configured to hold water for cooling first air and second air, the first air flowing through the first channel, the second air flowing through the second channel, a cooling unit configured to cool the first air by heat of vaporization of water held in the tank unit, a water supply channel for supplying water held in the tank unit to the cooling unit, and a water recovery channel for collecting water remaining in the cooling unit to the tank unit.

14 Claims, 5 Drawing Sheets

(56) References Cited

U.S. PATENT DOCUMENTS

| | | | |
|---|---|---|---|
| 5,117,652 A | 6/1992 | Takeuchi et al. | |
| 6,935,132 B1 * | 8/2005 | Urch | F24F 12/003 62/304 |
| 9,982,907 B2 * | 5/2018 | Maisotsenko | F24F 12/006 |
| 2017/0074553 A1 | 3/2017 | Dinnage | |

FOREIGN PATENT DOCUMENTS

| | | | |
|---|---|---|---|
| JP | S52-95864 A | 8/1977 | |
| JP | S55-063334 A | 5/1980 | |
| JP | S58-025939 B2 | 5/1983 | |
| JP | S61-107020 A | 5/1986 | |
| JP | H03-282137 A | 12/1991 | |
| JP | H10-311691 A | 11/1998 | |
| JP | 2005-156077 A | 6/2005 | |
| JP | 2006-105424 A | 4/2006 | |
| JP | 2006-105425 A | 4/2006 | |
| JP | 3132118 U | 5/2007 | |
| JP | 2007-139334 A | 6/2007 | |
| JP | 2012-42150 A | 3/2012 | |
| JP | 2014-92338 A | 5/2014 | |
| JP | 2014-149134 A | 8/2014 | |
| JP | 2014-190672 A | 10/2014 | |
| JP | 3193430 U | 10/2014 | |
| JP | 2015-034674 A | 2/2015 | |
| JP | 2015-034675 A | 2/2015 | |
| JP | 2015-62882 A | 4/2015 | |
| JP | 2016-023850 A | 2/2016 | |
| JP | 6147537 B2 | 6/2017 | |
| JP | 2018-526611 A | 9/2018 | |
| JP | 2019-86262 A | 6/2019 | |

OTHER PUBLICATIONS

Jul. 26, 2022 International Preliminary Report on Patentability issued in International Patent Application No. PCT/JP2021/001224.
Mar. 26, 2024 Office Action issued in Chinese Patent Application No. 202110070933.8.
Feb. 27, 2024 Office Action Issued in Japanese Patent Application No. 2021-140814.
Jan. 23, 2024 Extended European Search Report Issued in European Patent Application No. 21744045.2.
Sep. 19, 2023 Office Action issued in Japanese Patent Application No. 2021-140814.
Mar. 9, 2021 International Search Report issued in International Patent Application No. PCT/JP2021/001224.
Mar. 2, 2021 Office Action issued in Japanese Patent Application No. 2020-006967.
Jun. 18, 2021 Office Action issued in Japanese Patent Application No. 2021-075735.
Jun. 17, 2024 Office Action issued in Chinese Application No. 202110070933.8.
"Innovation and Practice of Refrigeration and Air-conditioning Technology", (Edited by Zhang Zhaohui, Beijing: China Textile Press, pp. 191-192, published Sep. 2019.

* cited by examiner

FIG. 3
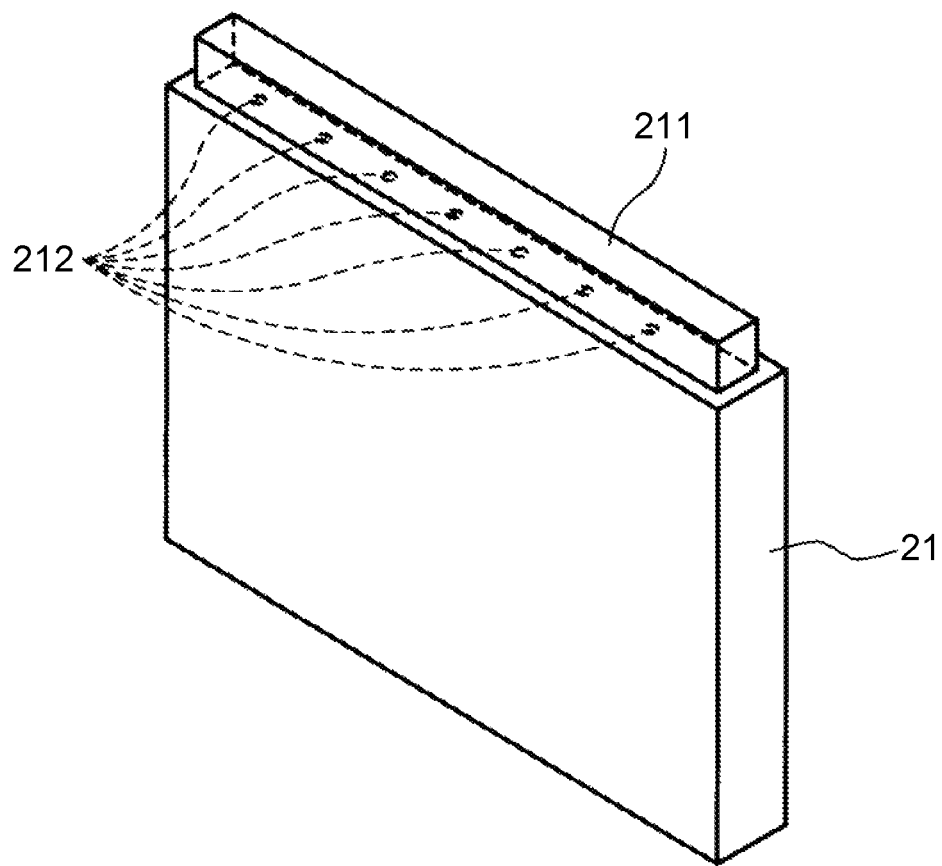
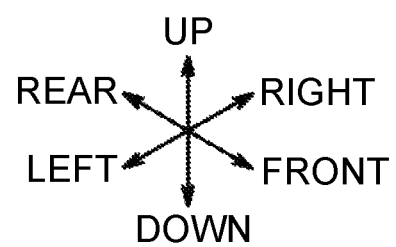

AIR CONDITIONER

REFERENCE TO RELATED APPLICATIONS

This application is a continuation of International Patent Application No. PCT/JP2021/001224 filed on Jan. 15, 2021, which claims priority from Japanese Patent Application No. 2020-006967 filed on Jan. 20, 2020. The entire contents of the aforementioned applications are incorporated herein by reference.

BACKGROUND ART

A known air conditioner of an evaporative cooling type takes in air in a room and blows air, which is cooled by lowering the ambient temperature using the heat of vaporization of water, into the room. The known air conditioner (evaporative cooler) includes an air blowing means disposed in a casing, a first channel, and a second channel. The first channel communicates with an inlet and a first outlet of the casing, and guides an air flow generated by, the air blowing means to the first outlet. The second channel communicates with the inlet and a second outlet, and guides the air flow generated by the air blowing means to the second outlet. A vaporizing means is disposed in the second channel to cool air flowing through the second channel by the heat of vaporization of water. A heat exchanger is provided for exchanging heat between the air flow cooled by the vaporizing means in the second channel and the air flow flowing through the first channel. In the second channel where the vaporizing means is disposed, the vaporizing means sprays atomized water (unevaporated sprayed water), and air having its absolute humidity increased due to evaporation of the atomized water (evaporated sprayed water) flows in an area downstream of the vaporizing means. The air with increased humidity is blown out as exhaust air from the second outlet which is an exit of the second channel. The air flow flowing through the first channel cooled via the heat exchanger is blown out from the first outlet to a space to be air-conditioned as supply air.

In the known air conditioner, the air flowing through the second channel by the air blowing means passes through a plurality of tubes of a sensible heat exchanger, and the air flowing through the first channel by the air blowing means passes around the plurality of tubes, so that heat is exchanged between the air flowing through the second channel and the air flowing through the first channel.

DESCRIPTION

However, in the known air conditioner, the air that has passed through a vaporization filter included in the vaporization means is discharged from the second outlet after heat exchange with the air that is supplied to the room by the sensible heat exchanger, and thus cannot be efficiently cooled.

According to an aspect of the disclosure, an air conditioner includes a housing having a first outlet and a second outlet, a first channel communicating with the first outlet, a second channel communicating with the second outlet, a tank unit configured to hold water for cooling first air and second air, the first air flowing through the first channel, the second air flowing through the second channel, a cooling unit configured to cool the first air by heat of vaporization of water held in the tank unit, a water supply channel for supplying water held in the tank unit to the cooling unit, and a water recovery channel for collecting water remaining in the cooling unit to the tank unit.

In this aspect, the cooling unit and the tank unit are connected by the water recovery channel to collect water remaining in the cooling unit to the tank unit. The cooling unit vaporizes water held in the tank unit, and cools the first air by the heat of vaporization of water, that is, latent heat. In this case, some water supplied from the tank unit to the cooling unit remains in a liquid state in the cooling unit without being vaporized, and the remaining liquid water is collected to the tank unit by the water recovery channel. The water remaining in the cooling unit, which is also cooled by the heat of vaporization of the vaporized water as with the first air, is collected to the tank unit, whereby the temperature of the water held in the tank unit can be lowered. By using the water in the tank unit whose temperature has been lowered in this way, the cooling efficiency in the cooling unit can be improved. That is, the heat of vaporization generated in the cooling unit is reused by collecting the water remaining in the cooling unit as a cold energy medium, whereby the cooling capacity of the air conditioner can be improved.

FIG. 3 is a schematic perspective view of a vaporization filter, illustrating an example configuration.

Figure 1:
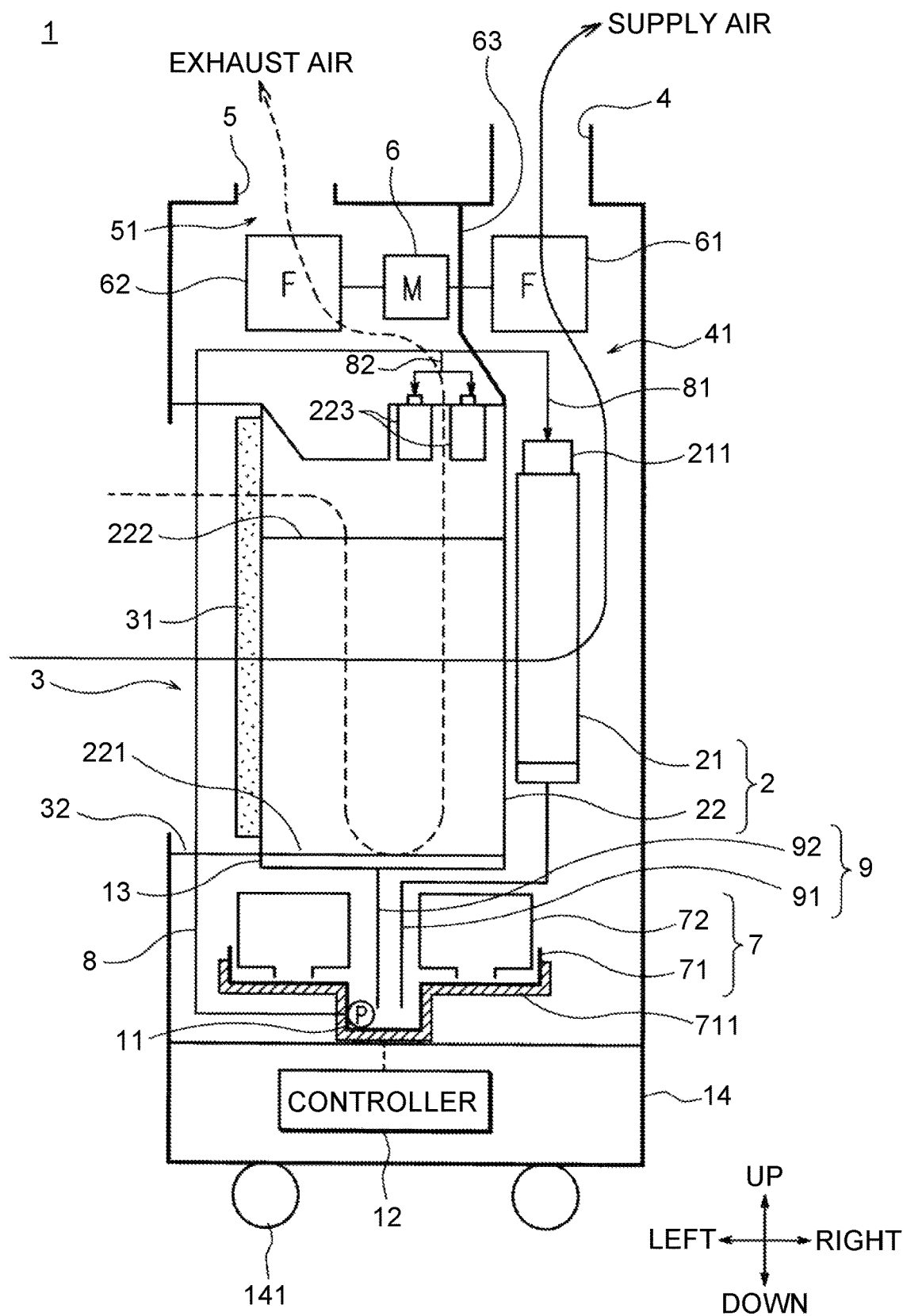
FIG. 1 is a schematic sectional view of an air conditioner according to an embodiment, illustrating an example configuration.
Figure 2:
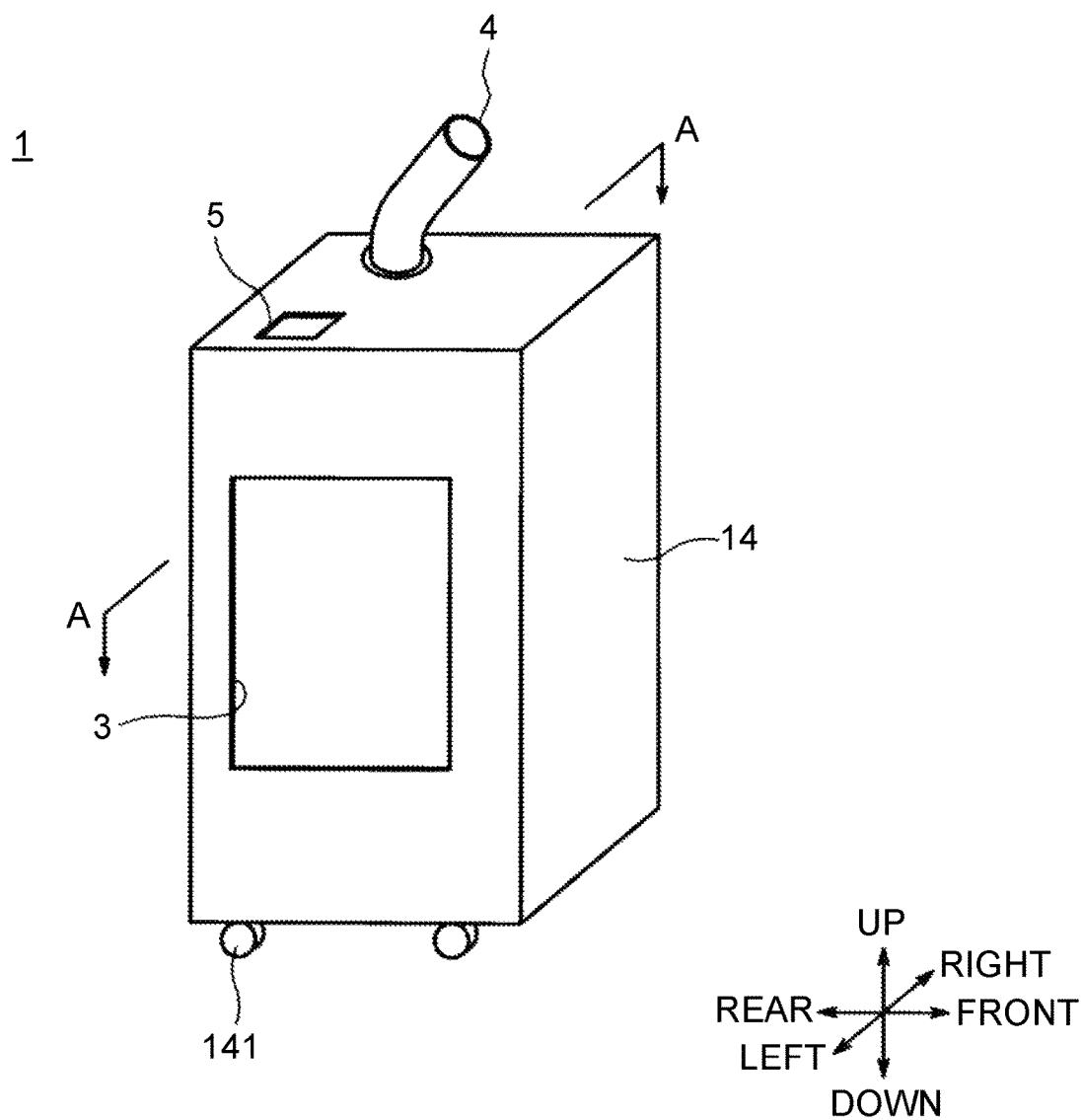
FIG. 2 is an external perspective view of the air conditioner.

Hereinafter, an embodiment will be described with reference to the drawings. FIG. 1 is a schematic sectional view of an air conditioner 1 according to the first embodiment, illustrating an example configuration. FIG. 2 is a perspective view illustrating the appearance of the air conditioner 1. The air conditioner 1 includes a box-shaped housing 14, and is placed on a floor surface of a space to be air-conditioned, such as a factory, by casters 141 provided on a bottom portion of the housing 14. The placement state of the air conditioner 1 illustrated in HG. 1 is illustrated as a normal use state of the air conditioner 1, with up, down, left, and right directions. FIG. 1 schematically illustrates a cross section taken along line A-A in FIG. 2 and viewed from the right side in FIG. 2.

The air conditioner 1 includes a tank unit 7 for storing water, and a cooling unit 2 including a vaporization filter 21 and a sensible heat exchanger 22, and uses the heat of vaporization of water supplied from the tank unit 7 to lower the ambient temperature by the vaporization filter 21 and provide cooling for the space to be air-conditioned, and is, for example, an evaporate cooling type air conditioner 1. Further, the air conditioner 1 cools the space to be air-conditioned by lowering the ambient temperature mainly by using the sensible heat of water supplied from the tank unit 7 through the sensible heat exchanger 22.

The housing 14 of the air conditioner 1 is provided with an inlet 3, a first outlet 4, and a second outlet 5. The inlet 3 is for taking in air in the space to be air-conditioned. The first outlet 4 is for discharging air (first air), which has passed through and been cooled by the cooling unit 2 including the sensible heat exchanger 22 and the vaporization filter 21, to the space to be air-conditioned as supply air. The second outlet 5 is for discharging air (second air), which has passed through the sensible heat exchanger 22 and exchanged sensible heat with water and the first air, as exhaust air.

The first outlet 4 and the second outlet 5 are provided on an upper surface of the housing 14. The air conditioner 1 is provided with a fan for conveying first air and second air, and the fan includes a first fan 61 for conveying the first air and a second fan 62 for conveying the second air.

The fans including the first fan 61 and the second fan 62 may be, for example, centrifugal fans such as sirocco fans or propeller fans. The first fan 61 is provided in proximity to the first outlet 4, and the second fan 62 is provided in proximity to the second outlet 5. That is, when, with respect to a flow of air of the air conditioner 1, the inlet 3 is the most upstream end and the first outlet 4 and the second outlet 5 are the most downstream ends, the first fan 61 and the second fan 62 are provided downstream in a flow direction of air. As the first fan 61 and the second fan 62 are provided downstream, these fans function as so-called suction fans, and ventilation channels in the air conditioner 1 can be maintained under negative pressure.

The first fan 61 and the second fan 62 share a single fan motor 6, and are connected to shafts at both ends of the fan motor 6, respectively. A partition plate 63 is provided between the second fan 62 and the first fan 61. The partition plate 63 can reliably prevent the first air conveyed by the first fan 61 from being mixed with the second air conveyed by the second fan 62.

The fan motor 6 is located on the second fan 62 side. Therefore, the partition plate 63 is provided between the fan motor 6 and the first fan 61. As the fan motor 6 is provided on the second fan 62 side in this way, the fan motor 6 can be cooled by the second air conveyed by the second fan 62, that is, exhaust air. Therefore, the fan motor 6 can be cooled efficiently using cold energy by the exhaust air without increasing the temperature of the first air conveyed by the first fan 61, that is, the supply air.

The air conditioner 1 is provided with a suction channel 32, a first channel 41, and a second channel 51 as ventilation channels. The suction channel 32 starts from the inlet 3 and communicates with the sensible heat exchanger 22. That is, the sensible heat exchanger 22 is provided downstream of the suction channel 32 in a flow direction of suction air flowing in the suction channel 32.

The sensible heat exchanger 22 is provided with first paths 221 through which the first air flows and second paths 222 through which the second air flows. The first paths 221 and the second paths 222 in the sensible heat exchanger 22 are defined by a plurality of metal plates disposed in parallel and each having a hollow structure. Each of the metal plates having a hollow structure may be composed of, for example, a plurality of fins or flat tubes. For example, the plate may be formed of a metal excellent in heat transfer, such as aluminum, copper, or an alloy, containing these as main components, thereby improving the efficiency of sensible heat exchange. The metal plates constituting the first paths 221 and the metal plates constituting the second paths 222 are stacked so as to be perpendicular to flow directions of the first air and the second air, and sensible heat is exchanged between the first air and the second air through the metal plates. The first paths 221 constitute part of the first channel 41 communicating with the first outlet 4. The second paths 222 constitute part of the second channel 51 communicating with the second outlet 5. The first paths 221 extend through the sensible heat exchanger 22 in the left-right direction (lateral direction) in FIG. 1, and the second paths 222 extend through the sensible heat exchanger 22 in the up-down direction (vertical direction) in FIG. 1. That is, the first paths 221 and the second paths 222 are orthogonal to each other.

Suction air having passed through the suction channel 32 flows into the sensible heat exchanger 22 from entrances of the first paths 221 and the second paths 222 defined in the sensible heat exchanger 22, and is divided into first air to flow into the first paths 221 and second air to flow into the second paths 222. That is, the first paths 221 and the second paths 222 defined in the sensible heat exchanger 22 form a flow dividing mechanism for dividing suction air.

As illustrated in the drawing, the entrances of the first paths 221 and the second paths are defined in a side surface (left side surface in the drawing) of the sensible heat exchanger 22, and the inlet 3 similarly defined in the side surface of the sensible heat exchanger 22 communicates with the entrances of the first paths 221 and the second paths 222 through the suction channel 32. A dust collecting filter 31 is disposed between the inlet 3 and the entrances of the first paths 221 and the second paths 222 or in the middle of the first paths 221.

The dust collecting filter 31 may be attached to the side surface of the sensible heat exchanger 22 where the entrances of the first paths 221 and the second paths 222 are defined, as illustrated in the drawing. The dust collection filter 31 can collect dust in suction air sucked from the inlet 3 and prevent dust buildup in the ventilation channels through which air in the air conditioner 1 flows.

As illustrated in the drawing, the first paths 221 and the second paths 222 in the sensible heat exchanger 22 are defined in parallel from the entrances of the respective paths to intermediate points thereof. In a region from these points onward, a crossflow is formed by first air flowing through the first paths 221 and second air flowing through the second paths 222. After passing through the region where the crossflow is formed, the second paths 222 extend toward a lower portion of the sensible heat exchanger 22. That is, exits which are terminal ends of the second paths 222 are provided at a bottom surface of the sensible heat exchanger 22.

A drain pan 13 is provided below the exits of the second paths 222 in the sensible heat exchanger 22. The second channel 51 from the drain pan 13 to the second outlet 5 extends upward from the drain pan 13, and is provided behind the sensible heat exchanger 22 in the drawing. Therefore, the second paths 222 of the sensible heat exchanger 22 and the second channel 51 from the drain pan 13 to the second outlet 5 form a channel that turns up. As described above, the second paths 222 of the sensible heat exchanger 22 constitute part of the second channel 51, and are included in the second channel 51. Accordingly, the second channel extends downward from an upper portion of the sensible heat exchanger 22, and includes a vertically turning portion from which the second channel 51 extends upward after passing through a place where the drain pan 13 is located.

The second fan 62 for conveying the second air is provided downstream of the second channel 51 from the drain pan 13 to the second outlet 5. The second channel 51 from the drain pan 13 to the second outlet 5 extends upward, and the second fan 62 is provided above the drain pan 13. The second air conveyed by the second fan 62 is blown out as exhaust air (EA) from the second outlet 5.

The exits which are terminal ends of the first paths 221 are provided on a side surface opposite to the side surface of the sensible heat exchanger 22 on which the entrances of the first paths 221 are provided. In the illustrated example, the first paths 221 are provided linearly from the left side surface of the sensible heat exchanger 22 to the right side surface.

In the flow direction of the first air, a vaporization filter 21 is provided downstream of the terminal ends of the first paths 221 of the sensible heat exchanger 22, that is, the exits of the first paths 221. The vaporization filter 21 is provided downstream of the exits of the first paths and between the sensible heat exchanger 22 and the first fan 61.

The vaporization filter 21 is provided such that one surface of a rectangular filter element faces the side surface of the sensible heat exchanger 22 provided with the exits of the first paths 221. The first channel 41 from the vaporization filter 21 to the first outlet 4 extends upward from the vaporization filter 21, The first fan 61 for conveying the first air is provided downstream of the first channel 41 from the vaporization filter 21 to the first outlet 4. The first fan 61 is provided above the vaporization filter 21. The first air conveyed by the first fan 61 is blown out as supply air (SM from the first outlet 4.

As described above, the air conditioner 1 includes the tank unit 7 for storing water to be supplied to the vaporization filter 21 and the sensible heat exchanger 22, and the tank unit 7 includes a first tank 71 and a second tank 72. The first tank 71 forms, for example, a rectangular box body having an opening in an upper portion thereof, and is provided below the vaporization filter 21 and the drain pan 13.

The first tank 71 is used to hold water collected through a water recovery channel 9 for collecting water remaining in the cooling unit 2. The water recovery channel 9 includes a first water recovery channel 91 and a second water recovery channel 92. The first tank 71 and the vaporization filter 21 are communicated with each other through the first water recovery channel 91, The first tank 71 and the drain pan 13 are communicated with each other through the second water recovery channel 92. Ends of the first water recovery channel 91 and the second water recovery channel 92 proximate to the first tank 71, that is, exits of the first water recovery channel 91 and the second water recovery channel 92, are directed to the opening of the first tank 71. Although the details will be described later, water remaining in the cooling unit 2 is water supplied from the first tank 71 to the vaporization filter 21 and the sensible heat exchanger 22, and is water remaining in a liquid state without being vaporized.

The vaporization filter 21 and the drain pan 13 provided below the sensible heat exchanger 22 are provided above the first tank 71. Therefore, the water remaining in a liquid state without being vaporized in the vaporization filter 21 flows into the first tank 71 through the first water recovery channel 91 by gravity. Water that has not been vaporized in the sensible heat exchanger 22 and remains in a liquid state flows into the first tank 71 via the drain pan 13 and the second water recovery channel 92.

The first tank 71 is provided inside with a pump 11 for supplying water held in the first tank 71 to the vaporization filter 21 and the sensible heat exchanger 22. The pump 11 is not limited to a case where the pump 11 is provided inside the first tank 71. A main body of the pump 11 may be provided outside the first tank 71 to convey water in the first tank 71 through a channel that communicates with the pump 11 and the first tank 71.

The pump 11 is connected to a controller 12 constituted by, for example, a microcomputer, through a communication line, and is driven or stopped based on a control signal output from the controller 12. Although the controller 12 is illustrated as being provided in a lower portion of the air conditioner 1 in the drawing, the controller 12 is not limited to this. For example, the controller 12 may be provided proximate to an outer peripheral surface of a channel wall forming the second channel 51 from the sensible heat exchanger 22 to the second outlet 5, and may be cooled by the second air via the channel wall forming the second channel 51.

The pump 11 is communicated with the vaporization filter 21 and the sensible heat exchanger 22 by a supply channel 8. Therefore, the first tank 71 communicates with the vaporization filter 21 and the sensible heat exchanger 22 via the pump 11 and the water supply, channel 8. The water supply channel 8 includes a first water supply channel 81 and a second water supply channel 82, and is branched into the first water supply channel 81 and the second water supply channel 82 in proximity to the vaporization filter 21 and the sensible heat exchanger 22. The first water supply channel 81 communicates with the vaporization filter 21. The second water supply channel 82 communicates with the sensible heat exchanger 22.

Water supplied from the first water supply channel 81 is once held in a first water supply part 211 provided above the vaporization filter 21, dripped into the vaporization filter 21 from water supply holes 212 provided in the first water supply part 211, and permeates into the vaporization filter 21. Water supplied from the second water supply channel 82 is dripped into the second paths 222 of the sensible heat exchanger 22 through the second water supply parts 223 provided above the sensible heat exchanger 22. The first water supply part 211 is formed as a part of the vaporization filter 21. As an example, the vaporization filter 21 may be detachable from a mounting position to the outside of the housing 14. As the unit includes the water supply, holes 212, a clogged water supply hole 212 can be cleaned by removing the unit from the main body.

The second water supply parts 223 are located downstream of the first paths 221 above the entrances of the second paths 222 of the sensible heat exchanger 22. That is, the second water supply parts 223 are provided closer to the exits of the first paths 221 than to the entrances thereof and above the entrances of the second paths 222. In the first paths 221 of the sensible heat exchanger 22, the closer to the second water supply parts 223, the lower the temperature due to the water supplied from the first tank 71. The temperature of the first air at the entrance of the first path 221 corresponds to the room temperature of the space to be air-conditioned, and is the highest temperature in the temperature distribution of the first air in the first path 221. In contrast, as the second water supply parts 223 are provided downstream of the first paths 221, that is, closer to the exits of the first paths 221 than to the entrances thereof, the temperature difference between the first air and the water can be made large over the entire region of the first paths 221, and the cooling efficiency for the first air can be improved.

In the present embodiment as illustrated in the drawing, since two second water supply parts 223 are provided above the sensible heat exchanger 22, the second water supply channel 82 is bifurcated corresponding to each of the two second water supply parts 223, but the present embodiment is not limited thereto. For example, one second water supply part 223 may be provided above the sensible heat exchanger, and the second water supply channel 82 may not be branched. Three or more second water supply parts 223 may be provided above the sensible heat exchanger 22, and the second supply water channel 82 may be branched into the number of the second water supply parts 223. Alternatively, the second water supply parts 223 provided above the sensible heat exchanger 22 may be combined into one, eliminating the need to branch the second water supply part 223.

Water is transported from the first tank 71 to the vaporization filter 21 and the sensible heat exchanger 22 by the pump 11 provided in the first tank 71, and water remaining in the vaporization filter 21 and the sensible heat exchanger 22 in a liquid state without being vaporized is returned to the first tank 71 by gravity. That is, the first tank 71, the water supply channel 8, the cooling unit 2, and the water recovery channel 9 form a circulating water channel.

The water supply channel 8 is branched into the first water supply channel 81 and the second water supply channel 82 in response to the vaporization filter 21 and the sensible heat exchanger 22 included in the cooling unit 2. The water recovery channel 9 is branched into the first water recovery channel 91 and the second water recovery channel 92 in response to the vaporization filter 21 and the sensible heat exchanger 22 included in the cooling unit Therefore, the circulating water channel includes a vaporization filter 21-based channel and a sensible heat exchanger 22-based channel that are in parallel. The vaporization filter 21-based channel is constituted by the first water supply channel 81, the vaporization filter 21, and the first water recovery channel 91. The sensible heat exchanger 22-based channel is constituted by the second water supply channel 82, the second paths 222 of the sensible heat exchanger 22, and the second water recovery channel 92.

In terms of the volumetric flow rate per unit time of water conveyed by driving of the pump 11, the volumetric flow rate in the first water supply channel 81, which is in the vaporization filter 21-based channel, is smaller than the volumetric flow rate in the second water supply channel 82, which is in the sensible heat exchanger 22-based channel. For example, the volumetric flow rate in the first water supply channel 81 may be 0.3 L/min, the volumetric flow rate in the second water supply channel 82 may be 3 L/min, and the volumetric flow rate in the first water supply channel 81 may be $\frac{1}{10}$ of the volumetric flow rate in the second water supply channel 82. This can increase the amount of water for cooling the second air by sensible heat in the sensible heat exchanger 22 while suppressing the amount of water vapor blown out to the space to be air-conditioned together with the first air. The cooling efficiency in the cooling unit 2 can be further improved.

A heat insulating member 711 may be attached to outer peripheral surfaces of the first tank 71, that is, the outer surfaces of a bottom plate and side plates of the first tank 71. As described above, water collected from the vaporization filter 21 is held in the first tank 71, and the water is cooled by the heat of vaporization. The heat insulating member 711 on the outer peripheral surfaces of the first tank 71 can prevent heat exchange between the water collected from the vaporization filter 21 and the ambient air of the first tank 71 via the bottom plate and the side plates of the first tank 71, to hold an increase in the temperature of the water collected from the vaporization filter 21. Similarly, the heat insulating member 711 may be attached to the outer peripheral surface of the first water recovery channel 91 that communicates with the vaporization filter 21 and the first tank 71.

The second tank 72 forms, for example, a rectangular box body, and is provided above the first tank 71 with a water supply port provided in a bottom surface facing downward. For example, the second tank 72 may be detachably provided with respect to the housing 14, and may be stored in the housing 14 after being replenished with tap water or other water in a state of being detached from the housing 14, Alternatively, the second tank 72 may be provided with a valve body for receiving replenishment of water from outside the housing 14, and tap water or the like may be replenished via the valve body. The volume of the second tank 72 is larger than the volume of the first tank 71. In the present embodiment, two second tanks 72 are provided, and the total volume of the two second tanks 72 is larger than the volume of the first tank 71. The number of second tanks 72 is not limited to two, and may be one or three or more. That is, irrespective of the number of the second tanks 72, the volume of the first tank 71 is smaller than the total volume of the second tanks 72. That is, since the amount of water to be circulated is small, a configuration that makes it easy to maintain a low water temperature is adopted.

The second tank 72 is provided above the first tank 71, that is, the bottom surface of the second tank 72 is located above the bottom surface of the first tank 71. When a level of water in the first tank 71 is lower than or equal to a predetermined value, a predetermined amount of water in the second tank 72 is supplied to the first tank 71. That is, the predetermined amount of water in the second tank 72 is supplied to the first tank 71 every time the amount of water held in the first tank 71 is lower than or equal to a predetermined value, thereby preventing water shortage or depletion in the first tank 71. As an example, when the opening for supplying water from the second tank 72 to the first tank 71 is at a position lower than the water surface of the first tank 71, the inside of the tank becomes a negative pressure that is lower than the atmospheric pressure, and water is not supplied. When the opening is at a position higher than the water surface of the first tank 71, a mechanism may be adopted in which air enters the second tank 72 from the opening and water is supplied to the first tank 71. Alternatively, a mechanism may be adopted in which a solenoid valve that can be controlled by the controller 12 and a sensor that detects the level of the water surface in the first tank 71 are provided, and the solenoid valve is opened for a certain period of time when the sensor detects that the level of the water surface is lower than a predetermined level.

Every time the level of water in the first tank 71 is lower than or equal to a predetermined value, a predetermined amount of water is to be supplied from the second tank 72 to the first tank 71. The predetermined amount of water, that is, a water supply amount at a time, is set to be smaller than or equal to half a total value of the volume of the first tank 71, the volume of the water supply channel 8, and the volume of the water recovery channel 9. As described above, water collected from the vaporization filter 21 is held in the first tank 71, and the water is cooled by the heat of vaporization. Therefore, the temperature of the water circulating between the first tank 71 and the cooling unit 2 can be stabilized at a relatively low temperature by setting the amount of water to be supplied from the second tank 72 to the first tank 71 at a time to be smaller than or equal to half the total value of the volume of the first tank 71 and the channel volume of the water supply channel 8 and the water recovery channel 9.

The air conditioner 1 sucks air in the space to be air-conditioned from the inlet 3, and the sucked air passes through the suction channel 32 and the dust collecting filter 31 and flows into the sensible heat exchanger 22. The entrances of the first paths 221 (SA: supply air paths) and the second paths 222 (EA: exhaust air paths) of the sensible heat exchanger 22 are provided on the side surface of the sensible heat exchanger 22 corresponding to an exit of the suction flow path 32, and suction air is divided into first air (SA)

flowing through the first paths 221 and second air (EA) flowing through the second paths 222.

Water supplied from the first, tank 71 is dripped into the second paths 222 through the second water supply parts 223 provided above the sensible heat exchanger 22. That is, in the second paths 222, the second air and the water dripped from the second water supply parts 223 are mixed. The water held in the first tank 71 is water collected from the vaporization filter 21 and is water cooled by the heat of vaporization. Therefore, the temperature of the water supplied from the first tank 71 is lower than the temperature of the second air immediately after flowing into the second paths 222. The second air exchanges sensible heat with water dripped from the second water supply parts 223, and is thus cooled by the water. In addition, although the structure of the second water supply parts 223 will be described in detail later, the water dripped from the second water supply parts 223 is distributed to the metal plates constituting the second paths 222 and drips into the metal plates, so that the surface area of the water in contact with the second air increases. Thus, part of the water dripped from the second water supply parts 223 is vaporized, and the second air is cooled by the heat of vaporization.

The first air flowing through the first paths 221 of the sensible heat exchanger 22 and the second air flowing through the second paths 222 form a crossflow, and sensible heat is exchanged between the first air and the second air. As described above, the second air flowing through the second paths 222 is cooled by the water supplied from the first tank 71, and the first air is cooled by the second air cooled by the water supplied from the first tank 71.

The first air that has passed through the first paths 221 of the sensible heat exchanger 22 flows into the first channel 41 from the sensible heat exchanger 22 to the first outlet 4. In the first channel 41, the vaporization filter 21 is provided downstream of the sensible heat exchanger 22, and the first air passes through the vaporization filter 21.

Water supplied from the first tank 71 is dripped into the vaporization filter 21 through the first water supply part 211 provided above the vaporization filter 21. Since the inside of the first channel 41 is maintained at a negative pressure, water supplied from the first tank 71 is sucked into the vaporization filter 21 from the water supply holes 212 provided in the bottom surface of the first water supply part 211, and penetrates into the vaporization filter 21. The water permeating into the vaporization filter 21 is vaporized by the first air passing through the vaporization filter 21, and is contained in the first air as water vapor by vaporization, that is, evaporation. The first air is cooled by the heat of vaporization, and the temperature of the first air is lowered. The cooled first air is blown out as supply air (SA) from the first outlet 4 into the space to be air-conditioned by the first fan 61.

With such a configuration, the first air blown out to the space to be air-conditioned as supply air (SA) can be cooled with a two-tiered cooling including primary cooling by the sensible heat exchanger 22 and secondary cooling by the vaporization filter 21. Therefore, the temperature of the first air can be further lowered in comparison with the direct vaporization system using only the vaporization filter 21.

Part of the water supplied from the first tank 71 to the vaporization filter 21 remains in the vaporization filter 21 as liquid water without being vaporized. The remaining water is also cooled by the heat of vaporization. The water remaining in the vaporization filter 21 moves below the vaporization filter 21 by gravity and is collected in the first tank 71 through the first water recovery channel 91 provided below the vaporization filter 21. Collecting of the water remaining in the vaporization filter 21 in this way can lower the temperature of the water stored in the first tank 71 and stabilize the water at a relatively low temperature.

As described above, the water stored in the first tank 71 is supplied to the sensible heat exchanger 22 and the vaporization filter 21, and the cooling capacity of the sensible heat exchanger 22 and the vaporization filter 21 can be improved by stabilizing the water stored in the first tank 71 so as to have a low temperature.

The second air flowing into the second paths 222 of the sensible heat exchanger 22 is mixed with water dripped and supplied from the second water supply parts 223, and is conveyed toward the exits of the second paths 222 located below the sensible heat exchanger 22. Since the second paths 222 extend toward the lower portion of the sensible heat exchanger 22 after passing through the region where the crossflow with the first paths 221 is formed, the second air mixed with the water supplied from the second water supply parts 223 flows from the upper portion of the sensible heat exchanger 22 toward its lower portion.

The drain pan 13 is provided downstream of the exits of the second paths 222 of the sensible heat exchanger 22, and the second channel 51 from the drain pan 13 to the second outlet 5 is extended upward from the drain pan 13. The second channel 51 is formed in a rear direction which is a depth direction of FIG. 1. Therefore, the second air mixed with the water supplied from the second water supply parts 223 flows out from the exits of the second paths 222 of the sensible heat exchanger 22, and then flows upward with respect to a certain point where the drain pan 13 is located as the lowest point. That is, the second channel 51 including the second paths 222 of the sensible heat exchanger 22 extends downward from the upper portion of the sensible heat exchanger 22, and includes a vertically turning portion from which the second channel 51 extends upward after passing through a place where the drain pan 13 is located.

When the second air mixed with the water supplied from the second water supply parts 223 passes through the turning portion, that is, when the flow direction is changed from the downward flow direction to the upward flow direction, centrifugal force is generated. Since water flowing together with the second air has a greater specific gravity than air, the water is moved toward the outer peripheral side of the turning portion due to centrifugal force, and thus separated from the second air, that is, gas-liquid separation is performed.

The water separated from the second air (by gas-liquid separation) is temporarily held in the drain pan 13, and is collected in the first tank 71 via the second water recovery channel 92 provided at a bottom surface of the drain pan 13. The water adhering to inner wall surfaces of the second paths 222 of the sensible heat exchanger 22 also moves to the exits of the second paths 222 by gravity and drips from the exits, whereby the water is held in the drain pan 13 and collected via the second water recovery channel 92 in the first tank 71.

Portions of the second paths 222 extending from an upper side of the sensible heat exchanger 22 to its lower side, the drain pan 13 provided below the exits of the second paths 222, and the second channel 51 extending upward from the drain pan 13 constitute a gas-liquid separator for separating water from a mixture of the second air and water supplied from the second water supply parts 223. The gas-liquid separator separates water from the second air, thus preventing an increase in the absolute humidity of the second air.

The second air having passed through the drain pan 13 flows into the second channel 51 from the drain pan 13 to the second outlet 5. The second channel 51 is provided, for example, between a side surface of the sensible heat exchanger 22 and an inner surface of the housing 14 opposed to the side surface, and the second air is conveyed from the drain pan 13 via the second channel 51 to a fan chamber in which the fan motor 6 and the second fan 62 are mounted. That is, the fan motor 6 is provided in the middle of the second channel 51, and thus cooled by the second air. The fan motor 6 is provided downstream of the gas-liquid separator, and thus can be efficiently cooled by the second air from which water has been separated. The second air that has cooled the fan motor 6 is blown out as exhaust air from the second outlet 5.

FIG. 3 is a schematic perspective view of the vaporization filter 21, illustrating an example configuration. For example, the vaporization filter 21 is detachable, and FIG. 3 shows a state in which the vaporization filter 21 is detached from the housing 14 for cleaning. The vaporization filter 21 has a rectangular plate shape, for example, and is formed of rayon polyester, nonwoven fabric, or the like. The vaporization filter 21 has water absorbency, and water supplied from the first water supply part 211 permeates the entire surface of the vaporization filter 21, thereby promoting vaporization of the water.

The first water supply part 211 constitutes a box body having an opening on an upper side and is placed above the vaporization filter 21. The bottom plate of the box body is formed in a rectangular shape, and a plurality of water supply holes 212 are provided in the bottom plate along the longitudinal direction.

The opening of the first water supply part 211 communicates with the first water supply channel 81 branched from the water supply channel 8 that extends from the first tank 71. Water supplied from the first water supply channel 81 is once held in the first water supply part 211 forming a box body, drips from the water supply holes 212 into the vaporization filter 21, and permeates into the vaporization filter 21.

The vaporization filter 21 is provided in a portion of the first channel 41 upstream of the first fan 61 in the flow direction of the first air. Therefore, the inside of the vaporization filter 21 becomes a negative pressure that is lower than the atmospheric pressure, and water once held in the first water supply part 211 is sucked into the vaporization filter 21 from the water supply holes 212. Therefore, the water can efficiently permeate into the vaporization filter 21. That is, a configuration is adopted in which the amount of water to be supplied can be adjusted by the degree of negative pressure due to the number of revolutions of the fan and an air velocity. In the present embodiment, a mechanism for supplying water by utilizing a negative pressure is adopted, but various configurations such as a mechanism for supplying water by its own weight can also be adopted.

Figure 4:
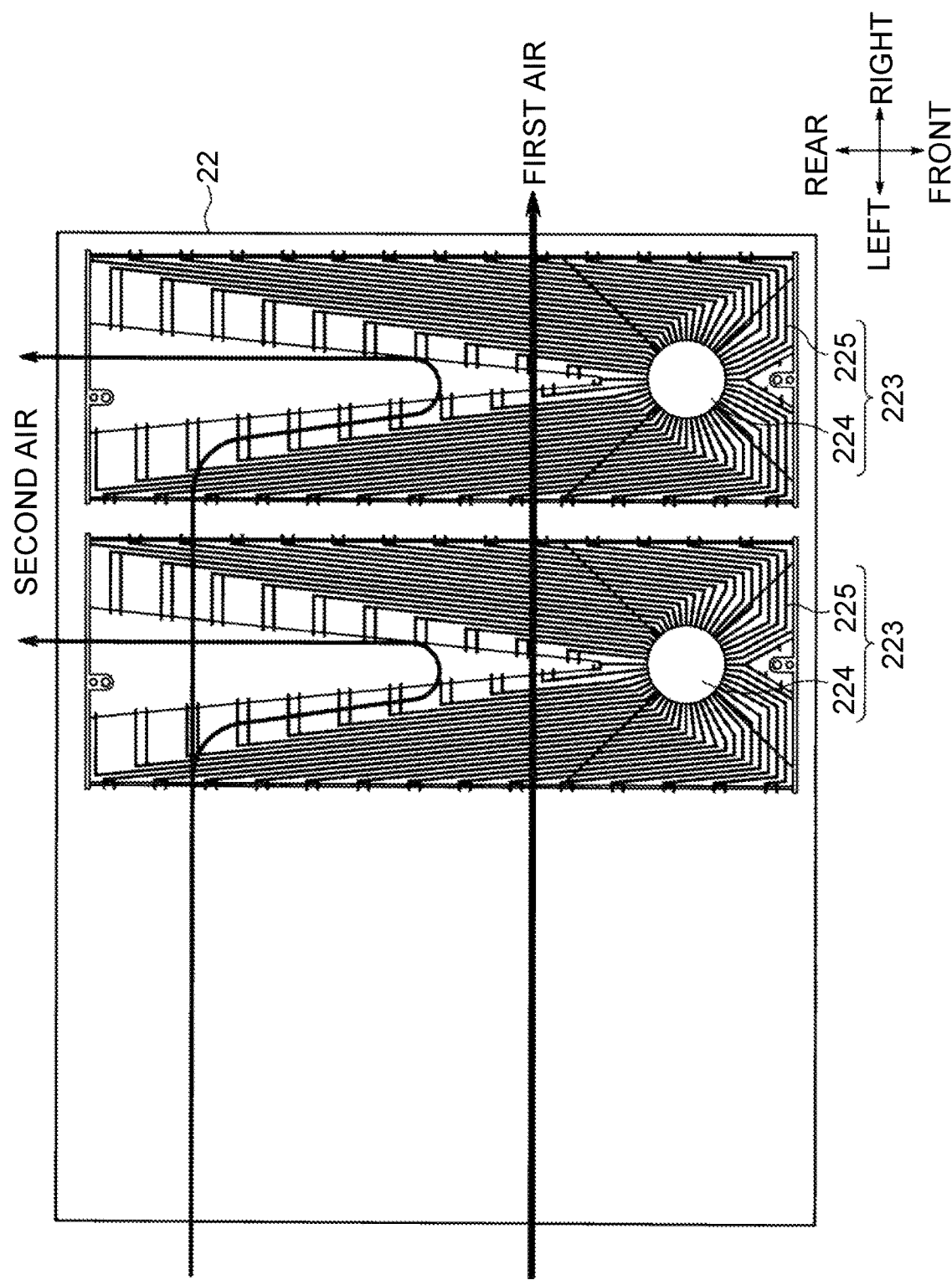
FIG. 4 is a schematic plan view of second water supply parts of a sensible heat exchanger, illustrating an example configuration.
Figure 5:
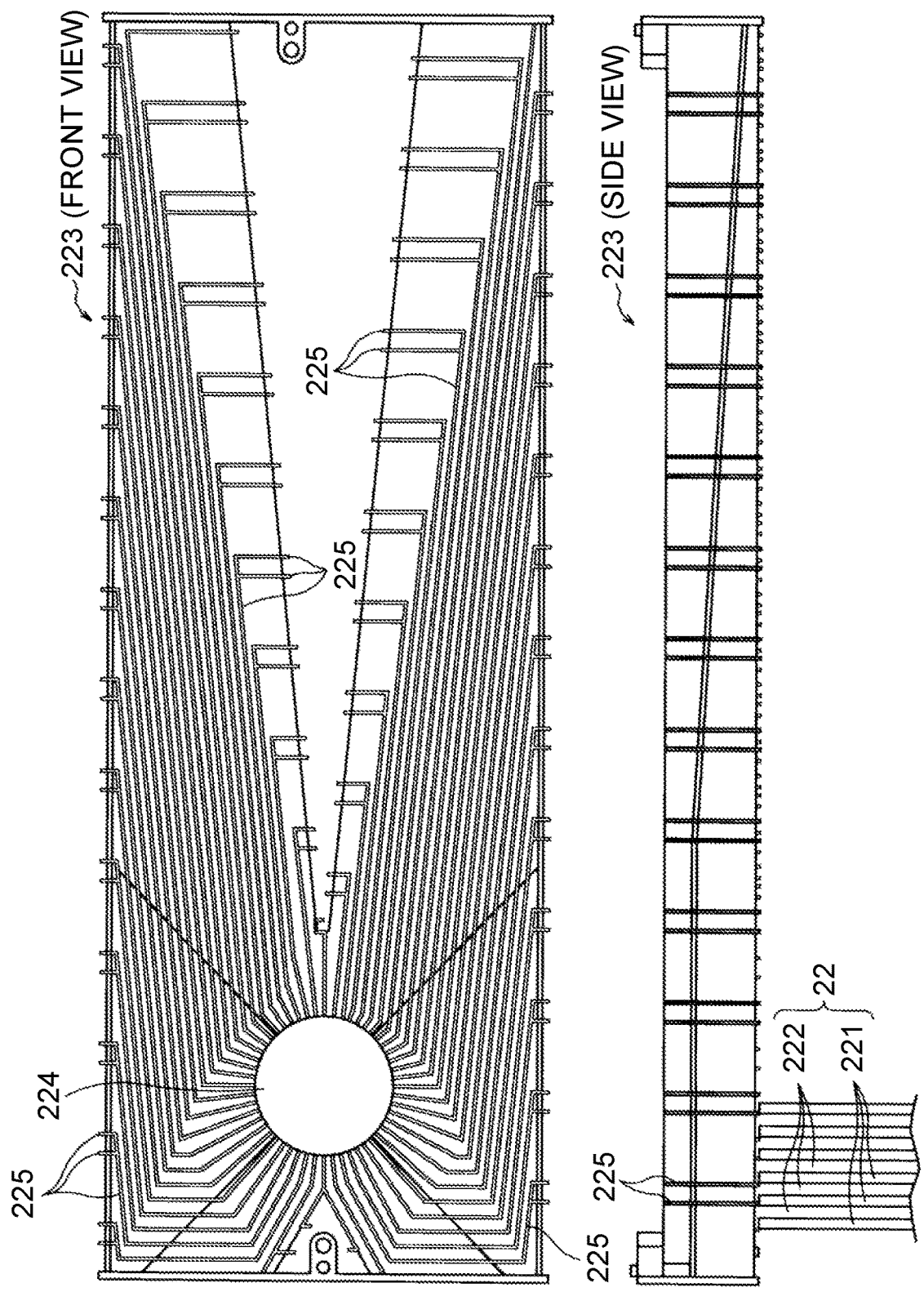
FIG. 5 illustrates a main part of a second water supply part.

FIG. 4 is a schematic plan view of the second water supply parts 223 of the sensible heat exchanger 22, illustrating an example configuration. FIG. 5 is an explanatory view for explaining a main part of the second water supply part 223. On the upper surface of the sensible heat exchanger 22, two second water supply parts 223 each having a rectangular box shape in a plan view are provided side by side. As described above, each of the second water supply parts 223 is provided downstream of the first paths 221. Each of the second water supply parts 223 is placed on the upper surface of the sensible heat exchanger 22 so that the longitudinal direction of the upper surface is perpendicular to the path directions of the first paths 221 and the second paths 222.

A cylindrical water receiver 224 and a plurality of ribs 225 radially extending from the water receiver 224 are provided on an upper surface of each of the second water supply parts 223. The water receiver 224 is provided proximate to one side of the upper surface in the longitudinal direction. The water receiver 224 communicates with the second water supply channel 82 branched from the water supply channel 8 that extends from the first tank 71.

Water supplied from the second water supply channel 82 is received in the water receiver 224 and then diverted along the ribs 225 radially extending from the water receiver 224, and diverted water is dripped into the second paths 222 of the sensible heat exchanger 22. That is, the second water supply part 223 functions as a water spray unit that sprays water supplied from the first tank 71 to each of the plurality of metal plates constituting the second paths 222 of the sensible heat exchanger 22.

The ribs 225 radially extending from the water receiver 224 are provided at equal intervals, and the pitch is, for example, 6 mm. The ribs 225 are each formed in an L-shape, a U-shape (C-shape) or a crank-shape by being bent once or more from the water receiver 224 toward a long edge portion of the upper surface.

Each of the ribs 225 is branched into two parallel ribs 225 at a point proximate to a long edge portion of the upper surface. The branched two ribs 225 are bent from the upper surface of the second water supply part 223 toward a side surface thereof and extend downward from an upper portion of the side surface.

On the upper surface of the second water supply part 223, a V-shaped notch is provided on a short side opposite to a short side where the water receiver 224 is provided, Some of the ribs 225, which are extended from the water receiver 224 toward the short side provided with the V-shaped notch, are bent toward an inner wall surface by which a V-shaped notch is defined, and extended downward from the upper part of the inner wall surface.

Pairs of parallel ribs 225 provided on side surfaces on the long sides and inner wall surfaces by which the V-shaped notch is defined, are defined as vertical ribs. The vertical ribs are arranged side by side at equal intervals on the side surfaces and the inner wall surfaces. As shown in FIG. 5, the vertical ribs on one side surface corresponding to the long side and the vertical ribs on the other side surface are staggered so as not to overlap with each other in a side view. That is, the vertical ribs on each side surface are provided such that, in a side view, a vertical rib on one side surface is located between adjacent vertical ribs on the other side surface. Similarly, as to the inner wall surfaces by which the V-shaped notch is defined, the vertical ribs on the respective inner wall surfaces facing each other are staggered.

The vertical ribs constituted by the pairs of parallel ribs 225 are provided in association with the second paths 222 of the sensible heat exchanger 22. The second water supply part 223 is located above the sensible heat exchanger 22 so that, as shown in FIG. 5, a direction where each vertical rib extends agrees with the vertical direction of each of the metal plates constituting the first paths 221 and the second paths 222. The second water supply part 223 is provided so that a rib of a pair of ribs 225 constituting a vertical rib is aligned with a second path of adjacent two second paths 222. The second water supply part 223 is provided so that a first path 221 is positioned between a pair of ribs 225 constituting a vertical rib.

Water diverted from the water receiver 224 flows between adjacent ribs 225 of the ribs 225 radially provided on the upper surface of the second water supply part 223. Water, which flows downward from the upper surface of the second water supply part 223 along its side surfaces or inner wall surfaces by which the V-shaped notch is defined, flows down along outer surfaces of two ribs 225 constituting a vertical rib. Since a rib of a pair of ribs 225 constituting a vertical rib is aligned with a second path of adjacent two second paths 222, water flowing down along an outer surface side of the pair of ribs 225 can be dripped into each of the adjacent two second paths 222.

In order to keep a spacing between ribs 225 provided on the upper surface, the number of vertical ribs that can be formed on a side surface is also limited. Thus, one of the side surfaces may have a second path 222 in which no water is dripped. In contrast, since the vertical ribs provided on the respective side surfaces are formed at staggered positions as shown in FIG. 5, water can be dripped into a second path 222 to which water is not dripped on one side surface by a vertical rib provided on the other side surface. Similarly, as to the inner wall surfaces by which the V-shaped notch is defined, water can be dripped into each of the corresponding second paths 222 by the vertical ribs provided at staggered positions. By the vertical ribs staggered as described above, the pitch between the ribs 225 provided on the upper surface can be sufficiently, kept and water supplied from the first tank 71 can be dripped into all the second paths 222 of the sensible heat exchanger 22.

In the present embodiment, the cooling unit 2 employs a configuration in which the remaining water is collected at the first tank 71 by the first water recovery channel 91 and the second water recovery channel 92. However, the cooling unit 2 may employ a configuration in which the first water recovery channel 91 is connected to the second water supply parts 223 and a pump is provided in the first water recovery channel 91 so that only the second water recovery channel 92 is connected to the first tank 71. This allows for cooling the circulating water more efficiently. Similarly, various configurations can be employed for the cooling unit 2 and the shape of channels of water in the cooling unit 2. Further, various types of heat exchangers can be applied to the cooling unit 2. As an example, not only heat is exchanged between at least one of the first air and the second air and water, but also a configuration for simply cooling water may be used as a substitute for the vaporization filter 21 or the sensible heat exchanger 22, or be included additionally.

It should be understood that the embodiment disclosed herein is illustrative in all respects and is not restrictive. The scope of the present invention is defined not by the above description but by the claims, and is intended to include all modifications within the scope and meaning equivalent to the claims.

APPENDIX A1

The air conditioner includes a housing having a first outlet and a second outlet, a first channel communicating with the first outlet, a second channel communicating with the second outlet, a tank unit to hold water for cooling first air flowing in the first channel and second air flowing in the second channel, and a cooling unit that cools the first air by the heat of vaporization of water held in the tank unit. The cooling unit includes a sensible heat exchanger and a vaporization filter. The sensible heat exchanger includes a first channel through which the first air flows and a second channel through which the second air flows, cools the second air by heat exchange with water supplied from the tank unit, and cools the first air by sensible heat exchange between the cooled second air and the first air. The vaporization filter is provided downstream of the sensible heat exchanger in a flow direction of the first air and cools the first air by latent heat of water supplied from the tank unit. Further, the air conditioner includes a supply channel for supplying water held in the tank unit to the sensible heat exchanger and the vaporization filter of the cooling unit, and a water recovery channel for collecting water remaining in the sensible heat exchanger and the vaporization filter to the tank unit.

APPENDIX A2

Further, the housing has an outlet for sucking the first air. The outlet, the sensible heat exchanger, and the vaporization filter are disposed linearly side by side, the sensible heat exchanger faces the outlet, and the vaporization filter faces the sensible heat exchanger. In the air conditioner according to Appendix A1, the first outlet and the second outlet are located above the sensible heat exchanger and the vaporization filter, and a first fan for blowing out the first air having passed through the vaporization filter from the first outlet, a second fan for blowing out the second air having passed through the sensible heat exchanger from the second outlet, and a motor for driving both fans are provided below the first outlet and the second outlet in the housing and above the sensible heat exchanger and the vaporization filter.

APPENDIX A3

Further, in the air conditioner according to Appendix A2, the outlet, the sensible heat exchanger, and the vaporization filter, which are disposed in the housing, are horizontally linearly aligned.

APPENDIX A4

Further, the air conditioner according to any one of Appendices A1 to A3 includes a second water supply part that is disposed in a supply channel between the tank unit and the sensible heat exchanger, and disposed at the upper part of the sensible heat exchanger to receive and supply water supplied from the water supply channel to the second channel.

APPENDIX A5

Further, in the air conditioner according to Appendix A4, the second water supply part is provided above the sensible heat exchanger and at a position proximate to an exit of the first air in the first path.

APPENDIX B1

The air conditioner includes a housing having a first outlet and a second outlet, a first channel communicating with the first outlet, a second channel communicating with the second outlet, a tank unit to hold water for cooling first air flowing in the first channel and second air flowing in the second channel, and a cooling unit that cools the first air by heat of vaporization of water held in the tank unit. The cooling unit includes a sensible heat exchanger and a vaporization filter. The sensible heat exchanger includes a first channel through which the first air flows and a second channel through which the second air flows, cools the second air by heat exchange with water supplied from the tank unit, and cools the first air by sensible heat exchange between the cooled second air and the first air. The vaporization filter is provided downstream of the sensible heat exchanger in a flow direction of the first air and cools the first air by latent heat of water supplied from the tank unit, A supply channel for supplying water held in the tank unit to the sensible heat exchanger and the vaporization filter of the cooling unit is provided. The air conditioner further includes a second water supply part disposed in the water supply channel between the tank unit and the sensible heat exchanger and provided above the sensible heat exchanger to receive water supplied from the water supply channel and supply the water to the second channel of the heat exchanger.

APPENDIX B2

The air conditioner according to Appendix B1 further includes a water recovery channel for collecting water remaining in the sensible heat exchanger and the vaporization filter to the tank unit, the tank unit being provided below the sensible heat exchanger.

APPENDIX B3

In the air conditioner according to Appendix B1 or B2, the housing has an inlet for sucking the first air, the housing inlet, the sensible heat exchanger, and the vaporization filter are disposed side by side, and the first outlet and the second outlet are provided at positions above the sensible heat exchanger and the vaporization filter, and in the same order along the same direction as the direction from the sensible heat exchanger toward the vaporization filter.

APPENDIX B4

In the air conditioner according to any one of Appendices B1 to B3, the first outlet and the second outlet are located above the sensible heat exchanger and the vaporization filter, and a first fan for blowing out the first air having passed through the vaporization filter from the first outlet, a second fan for blowing out the second air having passed through the sensible heat exchanger from the second outlet, and a motor for driving both fans are provided below the first outlet and the second outlet in the housing and above the sensible heat exchanger and the vaporization filter.

APPENDIX B5

Further, in the air conditioner according to Appendix B4, the first fan, the second fan, and the motor are provided above the second water supply part.

While the disclosure has been described in detail with reference to the specific embodiment thereof, this is merely an example, and various changes, arrangements and modifications may be applied therein without departing from the spirit and scope of the disclosure.

What is claimed is:

1. An air conditioner, comprising:
a housing having a first outlet and a second outlet;
a first channel communicating with the first outlet;
a second channel communicating with the second outlet;
a tank unit configured to hold water for cooling first air and second air, the first air flowing through the first channel, the second air flowing through the second channel;
a cooling unit configured to cool the first air by heat of vaporization of water held in the tank unit;
a water supply channel for supplying water held in the tank unit to the cooling unit; and
a water recovery channel for collecting water remaining in the cooling unit to the tank unit, wherein
the cooling unit includes:
a sensible heat exchanger configured to cool the second air by heat exchange with water supplied from the tank unit and cool the first air by sensible heat exchange between the cooled second air and the first air, and
a vaporization filter configured to cool the first air by heat of vaporization of water supplied from the tank unit;
the water supply channel includes a first water supply channel for supplying water to the vaporization filter and a second water supply channel for supplying water to the sensible heat exchanger; and
a volumetric flow rate of water in the second water supply channel is greater than a volumetric flow rate of water in the first water supply channel.

2. The air conditioner according to claim 1, wherein the tank unit includes
a first tank communicating with the water supply channel and the water recovery channel, and
a second tank configured to hold water to be supplied from outside the housing and to be supplied to the first tank.

3. The air conditioner according to claim 2, wherein the first tank has a volume smaller than the second tank has.

4. The air conditioner according to claim 2, wherein, when an amount of water in the first tank is lower than or equal to a predetermined value, the water in the second tank is supplied to the first tank.

5. The air conditioner according to claim 2, wherein an amount of water to be supplied from the second tank to the first tank at a time is smaller than or equal to half a total value of a volume of the first tank, a volume of the water supply channel, and a volume of the water recovery channel.

6. The air conditioner according to claim 2, wherein
the first tank is below the cooling unit, and
a bottom surface of the first tank is below a bottom surface of the second tank.

7. The air conditioner according to claim 1, wherein the vaporization filter is disposed downstream of the sensible heat exchanger in a flow direction of the first air.

8. The air conditioner according to claim 2, wherein the air conditioner comprises a plurality of second tanks each being the second tank.

9. An air conditioner, comprising:
a housing having a first outlet and a second outlet;
a first channel communicating with the first outlet;
a second channel communicating with the second outlet;
a tank unit configured to hold water for cooling first air and second air, the first air flowing through the first channel, the second air flowing through the second channel;
a cooling unit configured to cool the first air by heat of vaporization of water held in the tank unit;
a water supply channel for supplying water held in the tank unit to the cooling unit; and
a water recovery channel for collecting water remaining in the cooling unit to the tank unit, wherein
the cooling unit includes:
a sensible heat exchanger configured to cool the second air by heat exchange with water supplied from the tank unit and cool the first air by sensible heat exchange between the cooled second air and the first air, and a vaporization filter configured to cool the first air by heat of vaporization of water supplied from the tank unit;

the second channel has a portion downstream of the sensible heat exchanger in a flow direction of the second air and including a gas-liquid separator to turn a flow direction of the second channel from a lower side to an upper side;

the air conditioner further includes a fan and a fan motor disposed downstream of the gas-liquid separator in the flow direction of the second air; and the fan is configured to convey the first air and the second air, and the fan motor is configured to rotate the fan.

10. The air conditioner according to claim 9, wherein the fan includes a first fan configured to convey the first air and a second fan configured to convey the second air, and the fan motor is shared by the first fan and the second fan.

11. The air conditioner according to claim 10, further comprising a separation plate between the first fan and the second fan, the separation plate separating the first channel from the second channel.

12. The air conditioner according to claim 9, further comprising a first water supply part above the vaporization filter and configured to hold water to be supplied from the tank unit and to be supplied to the vaporization filter, wherein the first water supply part has a water supply hole communicating with the vaporization filter, and wherein the fan is downstream of the vaporization filter in a flow direction of the first air.

13. An air conditioner, comprising:
a housing having a first outlet and a second outlet;
a first channel communicating with the first outlet;
a second channel communicating with the second outlet;
a tank unit configured to hold water for cooling first air and second air, the first air flowing through the first channel, the second air flowing through the second channel;
a cooling unit configured to cool the first air by heat of vaporization of water held in the tank unit;
a water supply channel for supplying water held in the tank unit to the cooling unit; and
a water recovery channel for collecting water remaining in the cooling unit to the tank unit, wherein
the cooling unit includes:
a sensible heat exchanger configured to cool the second air by heat exchange with water supplied from the tank unit and cool the first air by sensible heat exchange between the cooled second air and the first air, and a vaporization filter configured to cool the first air by heat of vaporization of water supplied from the tank unit;

the sensible heat exchanger has a plurality of paths constituting part of the second channel and extending in an up and down direction;

the air conditioner further comprises a second water supply part above the sensible heat exchanger, the second water supply part being to hold water to be supplied to each of the plurality of paths; and the second water supply part includes a water receiver to receive water supplied from the tank unit, and a plurality of ribs each radially extending from the water receiver toward a corresponding path of the plurality of paths.

14. The air conditioner according to claim 13, wherein the second water supply part is downstream of the sensible heat exchanger in the flow direction of the second air.

* * * * *